United States Patent
Cheng et al.

(10) Patent No.: US 10,289,478 B2
(45) Date of Patent: May 14, 2019

(54) SYSTEM FAULT DIAGNOSIS VIA EFFICIENT TEMPORAL AND DYNAMIC HISTORICAL FINGERPRINT RETRIEVAL

(71) Applicant: NEC Laboratories America, Inc., Princeton, NJ (US)

(72) Inventors: Wei Cheng, Plainsboro, NJ (US); Kenji Yoshihira, Princeton Junction, NJ (US); Haifeng Chen, West Windsor, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 15/490,499

(22) Filed: Apr. 18, 2017

(65) Prior Publication Data

US 2017/0308427 A1   Oct. 26, 2017

Related U.S. Application Data

(60) Provisional application No. 62/327,489, filed on Apr. 26, 2016.

(51) Int. Cl.
| | | |
|---|---|---|
| G06F 11/00 | (2006.01) | |
| G06F 11/07 | (2006.01) | |
| H04L 12/24 | (2006.01) | |

(52) U.S. Cl.
CPC ........ *G06F 11/0793* (2013.01); *G06F 11/079* (2013.01); *G06F 11/0709* (2013.01); *H04L 41/064* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,367,029 B1 * | 4/2002 | Mayhead | ............ | G06F 11/1625 709/203 |
| 7,395,457 B2 * | 7/2008 | Jiang | ................... | G06F 11/0751 714/45 |
| 8,185,781 B2 * | 5/2012 | Chen | ................... | G06F 11/0709 714/26 |

(Continued)

OTHER PUBLICATIONS

Chen et al., "Exploiting Local and Global Invariants for the Management of Large Scale Information Systems", 2008 Eighth IEEE International Conference on Data Mining, Dec. 2008, pp. 113-122.

(Continued)

*Primary Examiner* — Amine Riad
(74) *Attorney, Agent, or Firm* — Joseph Kolodka

(57) ABSTRACT

Methods are provided for both single modal and multimodal fault diagnosis. In a method, a fault fingerprint is constructed based on a fault event using an invariant model. A similarity matrix between the fault fingerprint and one or more historical representative fingerprints are derived using dynamic time warping and at least one convolution. A feature vector in a feature subspace for the fault fingerprint is generated. The feature vector includes at least one status of at least one system component during the fault event. A corrective action correlated to the fault fingerprint is determined. The corrective action is initiated on a hardware device to mitigate expected harm to at least one item selected from the group consisting of the hardware device, another hardware device related to the hardware device, and a person related to the hardware device.

16 Claims, 6 Drawing Sheets

(56) References Cited

U.S. PATENT DOCUMENTS

| | | | | |
|---|---|---|---|---|
| 8,924,787 B2* | 12/2014 | Lumezanu | .......... | G06F 11/3006 |
| | | | | 714/26 |
| 9,913,139 B2* | 3/2018 | Gross | .................... | H04W 12/06 |
| 2008/0139971 A1* | 6/2008 | Lockhart | .................. | A61N 7/00 |
| | | | | 601/2 |
| 2009/0077540 A1* | 3/2009 | Zhou | .................. | G06F 11/3612 |
| | | | | 717/126 |
| 2013/0055399 A1* | 2/2013 | Zaitsev | .............. | H04L 63/0263 |
| | | | | 726/25 |

OTHER PUBLICATIONS

Jiang et al., "Discovering Likely Invariants of Distributed Transaction Systems for Autonomic System Management", IEEE International Conference on Autonomic Computing, Oct. 2006, pp. 199-208.

* cited by examiner

SYSTEM FAULT DIAGNOSIS VIA EFFICIENT TEMPORAL AND DYNAMIC HISTORICAL FINGERPRINT RETRIEVAL

RELATED APPLICATION INFORMATION

This application claims priority to U.S. Provisional Patent Application Ser. No. 62/327,489 filed on Apr. 26, 2016, incorporated herein by reference in its entirety.

BACKGROUND

Technical Field

The present invention generally relates to fault diagnosis and more particularly to system fault diagnosis via efficient temporal and dynamic historical fingerprint retrieval.

Description of the Related Art

A central task in running large scale distributed systems and cyber-physical systems is to automatically monitor the system status and diagnose system fault, so as to guarantee stable and high-quality services or outputs. Significant research efforts have been devoted to this topic. Traditional approaches rely on thorough understandings of the system architecture to build system models and the predefined rules for the diagnosis. With the increasing of system complexity, it is hard, if not impossible, to obtain a precise system architecture beforehand. Moreover, typically the system statuses are quite dynamic with time evolving. Thus, it is desirable to design an effective method that is able to automatically diagnose system failure and give action suggestions. Recently, the fault detection in distributed systems received increasing attentions. One system proposed to model event correlation and locate system faults using known dependency relationships between faults and symptoms. In real applications, however, it is usually hard to obtain such relationships precisely. To alleviate this limitation, another system developed several model-based approaches to detect the faults in complex distributed systems. These approaches generally focus on locating the faulty components, they are not capable of spotting or ranking the causal anomalies, thus they are not able to give action suggestions.

SUMMARY

According to an aspect of the present principles, a computer-implemented method is provided for single modal fault diagnosis. The method includes constructing, by a processor using an invariant model, a fault fingerprint based on a fault event. The method also includes deriving, by the processor using dynamic time warping and at least one convolution, a similarity matrix between the fault fingerprint and one or more historical representative fingerprints. The method additionally includes determining, by the processor, a corrective action correlated to the fault fingerprint, from among a plurality of candidate corrective actions associated with the one or more historical representative fingerprints, based on a unity similarity obtained by processing the similarity matrix. The method also includes initiating, by the processor, the corrective action on a hardware device to mitigate expected harm to at least one item selected from the group consisting of the hardware device, another hardware device related to the hardware device, and a person related to the hardware device.

According to another aspect of the present principles, a computer-implemented method is provided for multimodal fault diagnosis. The method includes constructing, by a processor using an invariant model, a fault fingerprint based on a fault event. The method also includes generating, by the processor, a feature vector in a feature subspace for the fault fingerprint, wherein said feature vector includes at least one status of at least one system component during the fault event. The method additionally includes determining, by the processor, a corrective action correlated to the fault fingerprint, from among a plurality of candidate corrective actions associated with the one or more historical representative fingerprints, based on a Jaccard similarity using the feature vector in the feature subspace. The method also includes initiating, by the processor, the corrective action on a hardware device to mitigate expected harm to at least one item selected from the group consisting of the hardware device, another hardware device related to the hardware device, and a person related to the hardware device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Since many system faults also occur repeatedly, it is possible to diagnose system failure by retrieval from a historical symptom database. Specifically, an embodiment may extract the system fingerprint based on an invariant model, which learns the dependencies between system components. When a failure happens, a sequence of broken invariants is recorded in a binary matrix to represent the temporal and dynamic failure behavior. A fingerprint database is built to store all such historical system fault fingerprints as well as their failure reasons or possible action annotations. Then the system fault diagnosis solves the problem of symptom fingerprint retrieval, which highly depends on the similarity measurement between a query fingerprint temporal matrix and the historical fingerprint records. The case of single modal symptom retrieval and the multimodal symptom retrieval are decoupled. For a multimodal symptom, the fingerprint matrix is compacted into a feature vector, then a chi-square feature selection method is employed to select, out the most informative broken dependencies, between system components for the fault annotations. The new feature vector in the subspace is used to calculate the similarity score. For a single modal symptom, an effective metric, based on dynamic time warping and sequence convolution, is defined to measure the similarity between query fingerprint and historical representative fingerprint records. The metric is able to extract single modal temporal features.

Figure 1:
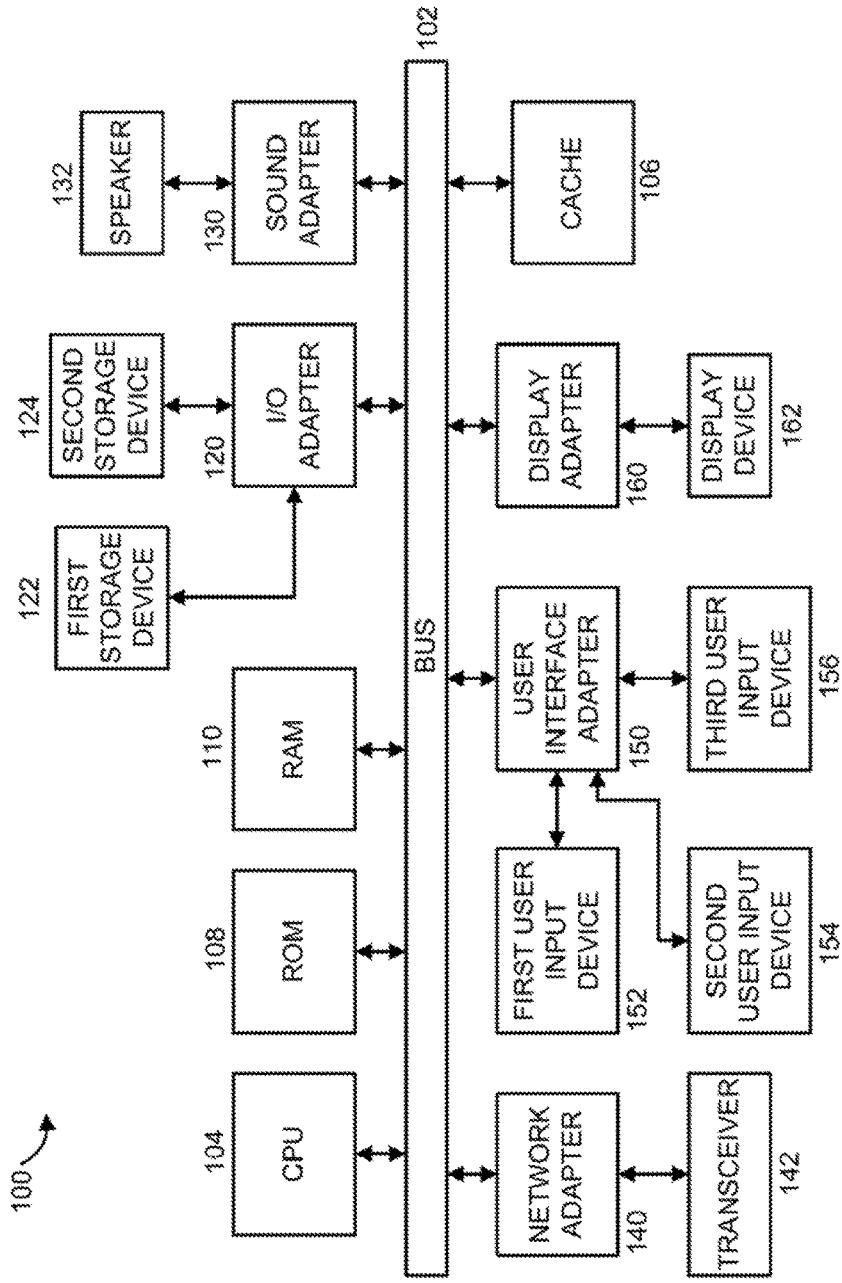
FIG. 1 shows a block diagram of an exemplary processing system to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the an given the teachings of the present invention provided herein.

Figure 2:
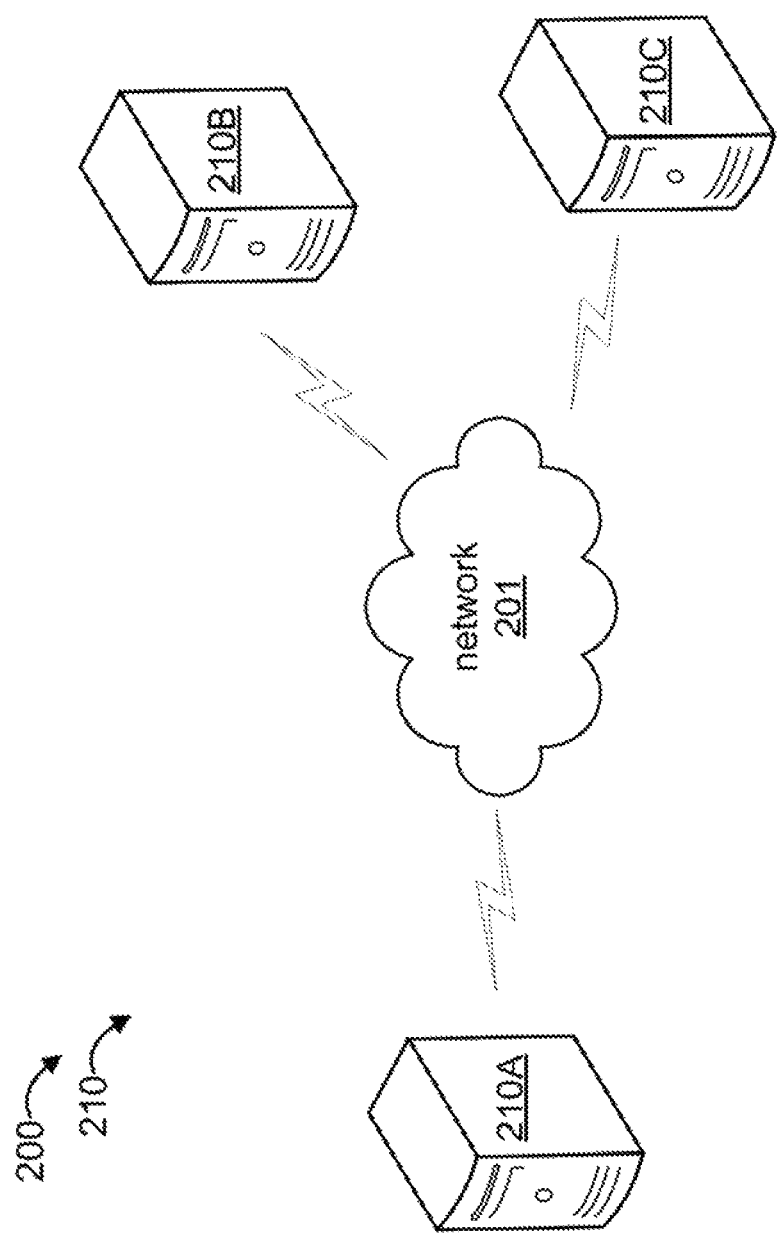
FIG. 2 shows a block diagram of an exemplary environment to which the present invention can be applied, in accordance with an embodiment of the present invention.
Figure 6:
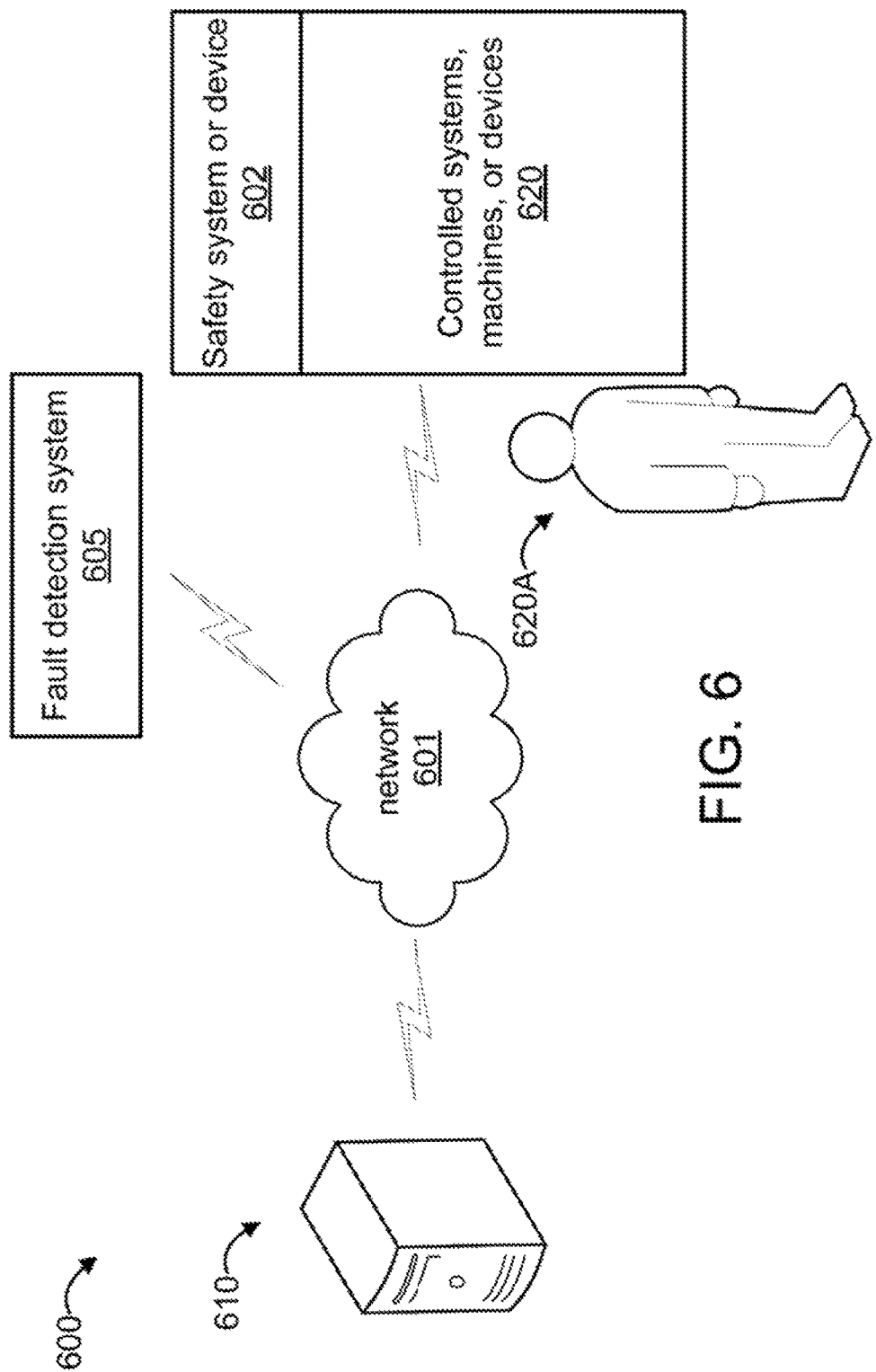
FIG. 6 shows a block diagram of an exemplary environment to which the present invention can be applied, in accordance with an embodiment of the present invention.

Moreover, it is to be appreciated that environment 200 and environment 600 described below with respect to FIG. 2 and FIG. 6 are environments for implementing respective embodiments of the present invention. Part or all of processing system 100 may be implemented in one or more of the elements of environment 200 and/or one or more of the elements of environment 600.

Figure 3:
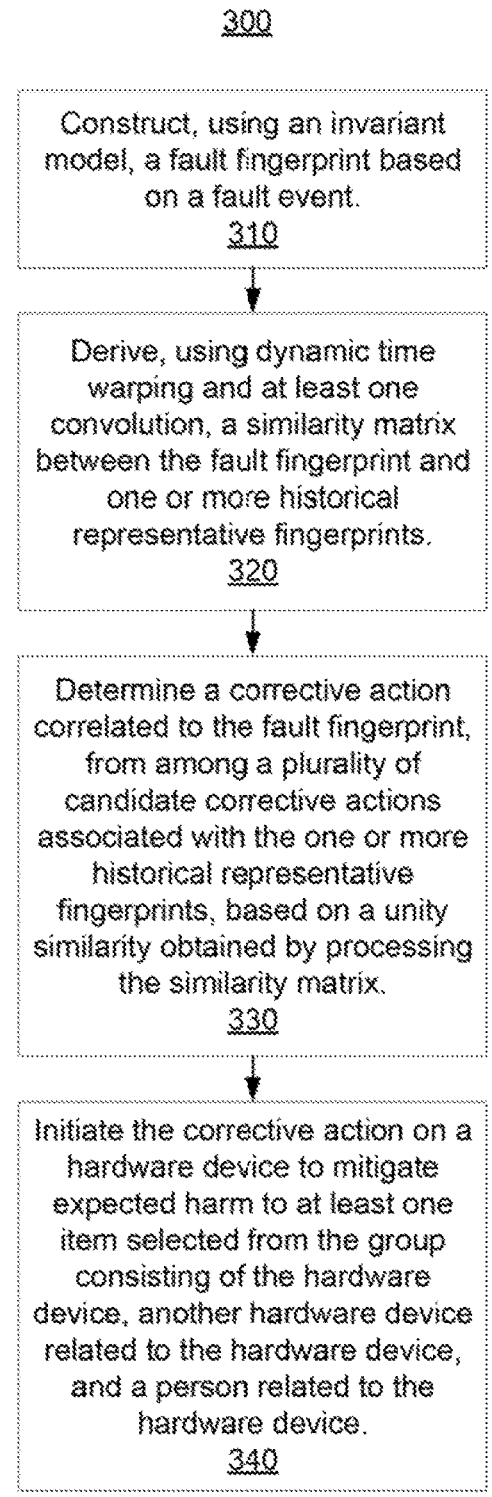
FIG. 3 is a block diagram illustrating a method for single modal fault diagnosis, in accordance with an embodiment of the present invention.
Figure 4:
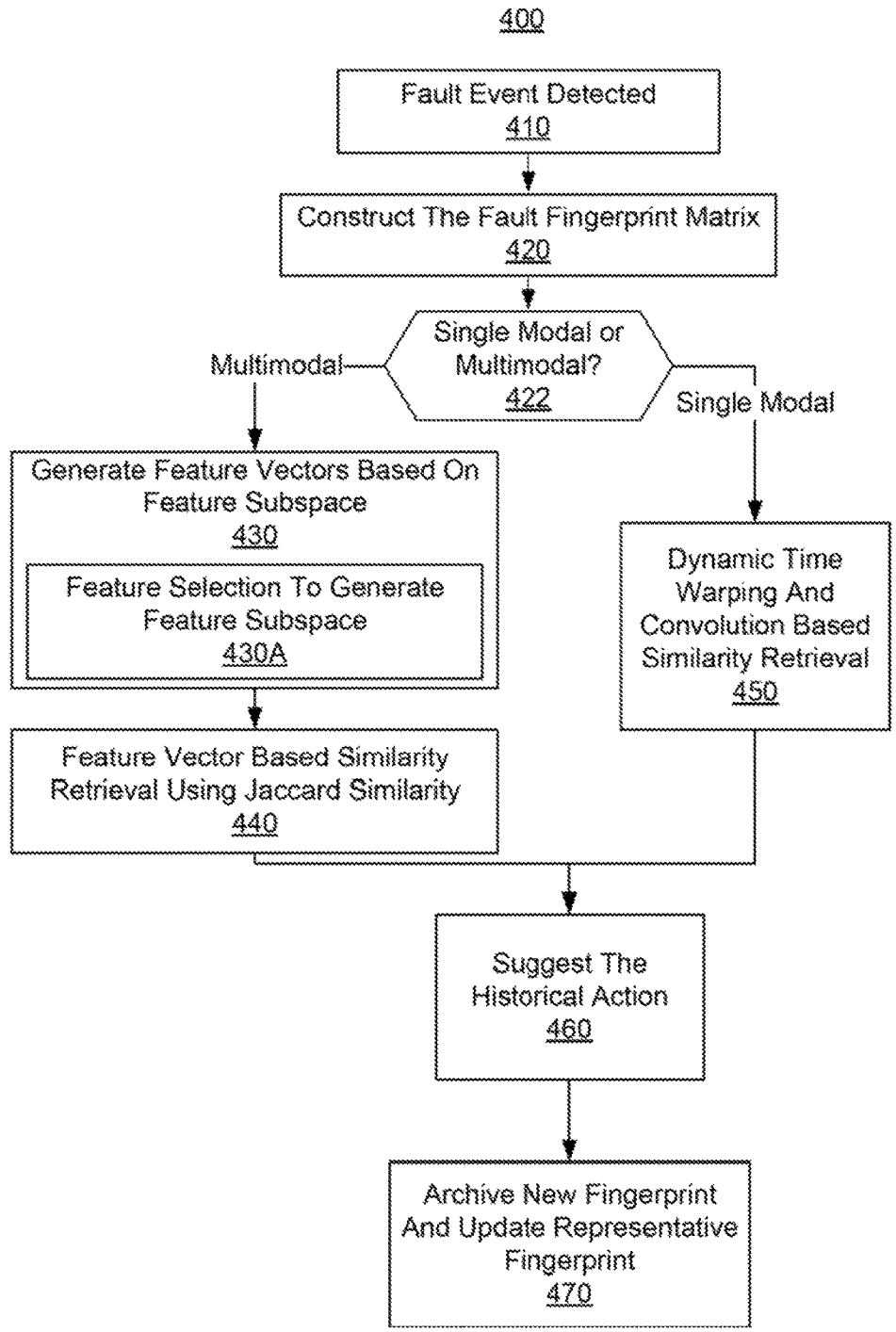
FIG. 4 shows a block/flow diagram illustrating a method for both single modal and multimodal fault diagnosis, in accordance with an embodiment of the present invention.
Figure 5:
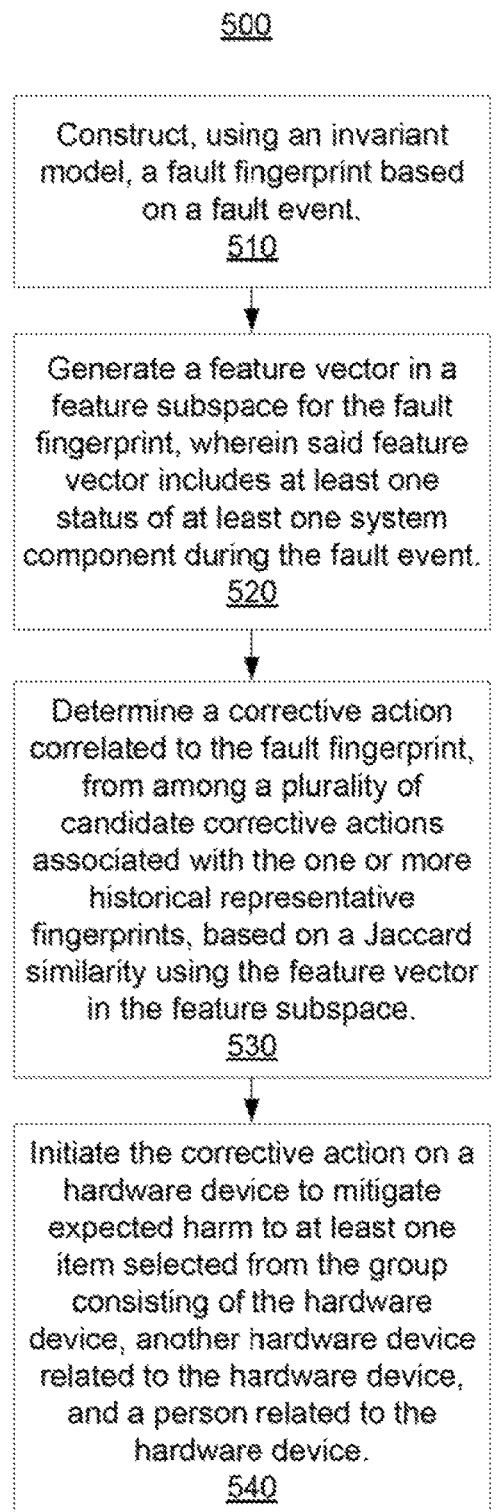
FIG. 5 is a block diagram illustrating a method for multimodal fault diagnosis, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5. Similarly, part or all of system 210 and/or system 610 may be used to perform at least part of method 300 of FIG. 3 and/or at least part of method 400 of FIG. 4 and/or at least part of method 500 of FIG. 5.

FIG. 2 shows an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 at least includes a set of computer processing systems 210. The computer processing systems 210 can be any type of computer processing system including, but not limited to, servers, desktops, laptops, tablets, smart phones, media playback devices, and so forth. For the sake of illustration, the computer processing systems 210 include server 210A, server 210B, and server 210C.

In an embodiment, the present invention performs system fault diagnosis via efficient temporal and dynamic historical fingerprint retrieval on the computer processing systems 210. Thus, any of the computer processing systems 210 can perform system fault diagnosis via efficient temporal and dynamic historical fingerprint retrieval that produce a fault event, or accessed by, any of the computer processing systems 210. Moreover, the output (including corrective actions) of the present invention can be used to control other systems and/or devices and/or operations and/or so forth, as readily appreciated by one of ordinary skill in the art given the teachings of the present invention provided herein, while maintaining the spirit of the present invention.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

Referring to FIG. 3, a block diagram illustrating a single modal fault diagnosis method 300, in accordance with an embodiment of the present invention. In block 310, construct, using an invariant model, a fault fingerprint based on a fault event. In block 320, derive, using dynamic time warping and at least one convolution, a similarity matrix between the fault fingerprint and one or more historical representative fingerprints. In block 330, determine a corrective action correlated to the fault fingerprint, from among a plurality of candidate corrective actions associated with the one or more historical representative fingerprints, based on a unity similarity obtained by processing the similarity matrix. In block 340, initiate the corrective action on a hardware device to mitigate expected harm to at least one item selected from the group consisting of the hardware device, another hardware device related to the hardware device, and a person related to the hardware device.

This method achieves accurate diagnosis for complex and dynamic temporal fingerprints with the help of historical failure experiences. The advantages of this method are two-fold. (A) The case of single modal fingerprint is decoupled from the multimodal fingerprint cases, with different similarity measures adopted for each. As a result, the method can extract accurate representative fingerprints for each historical system faults and better calculate the incoming new query fingerprint of failure event. (B) Effective approaches are developed to calculate the pair-wise fingerprints similarity. This approach for single modal fingerprints similarity measurement will capture both spatial and multiple temporal evidences encoded in the fault fingerprints.

The fault fingerprint retrieval process adopts an effective feature selection procedure to extract the most informative broken correlations between system components. This gives two critical advantages: (A) since only a small portion of the broken correlations are selected based on their importance, the similarity measurement between query fingerprints and the historical fingerprints is more robust to noise, and thus more accurate fault diagnosis can be obtained; (B) due to the fact that the similarity calculation is on a lower space, the time complexity of it can be significantly reduced.

An efficient indexing strategy for historical fingerprints is deployed. The index of each historical fingerprint is referred to as the representative fingerprint. For each query fingerprint, the method only needs to calculate the similarity to each achieved representative fingerprint. As a result, the searching space is significantly reduced. Actually, a constant number of fingerprint (the same as the number of types of fault) similarity measurements are needed, even when the fault fingerprint database increases as more new fingerprints are archived with system running. Thus, better online time performance can be achieved.

FIG. 4 shows a block/flow diagram illustrating both a single modal and a multimodal fault diagnosis method 400, in accordance with an embodiment of the present invention. The both the single modal and the multimodal fault diagnosis method 400 may have a fault event detected in step 410. Step 410 may feed in to step 420 that constructs the fault fingerprint matrix. Step 420 may train an invariant model using time series data during system normal periods and use online tests when system invariants are broken during system running periods. The invariant model learns the continuous pair-wised correlations between different system components. The invariant model may include an autoregressive model. Existing systems may be used to track vanishing correlations. At each time point, the (normalized) residual between the measurement and the measurement's estimate are computed. If the residual exceeds a predefined threshold, then the invariant is declared as "broken" as the correlation between the two time series vanishes. Step 420 may construct a temporal and spatial fingerprint matrix, the temporal and spatial fingerprint matrix may include which pairs of components are broken and at which time points the components are broken.

After step 420, determine 422 based on the fault event whether to perform a single modal process or a multimodal process on the fault fingerprint. If it is determined to perform a single modal process, then proceed to step 450. Otherwise, proceed to step 430. For the single modal process, step 420 will feed into step 450 for similarity retrieval based on a dynamic time warping and convolutions. Step 450 may use one representative fingerprint as the index for each category of historical fingerprints. Step 450 may calculate the similarity between query and historical fingerprints using a combination of dynamic time warping and convolution. The query and historical fingerprints using a combination of dynamic time warping and convolution may use a sliding window on both query and historical representative fingerprints. The convolution similarity between each sliding window for query and historical record is calculated. The maximum of the convolution score is used as the similarity. f(t) is denoted as the invariant status vector at time t, g(t) is another invariant sequence. The convolution score is $c(t)=f(t) \otimes g(t)$, and the similarity $s_{fg}=\max_t\{c(t)\}$. The unity similarity for each vector pair may be based on a Jaccard similarity:

$$\frac{\sum_i [f(t) \wedge g(t)]_i}{\sum [f(t) \vee g(t)]_i}.$$

The similarity calculation between two window blocks may be based in convolution. The overall similarity may be given by dynamic time warping. The dynamic time warping is able to capture both local temporal patterns and the multimodal temporal patterns.

For the multimodal process, step 420 will feed into step 430 to generate a feature vector based on a feature subspace. Step 430 may include step 430A that selects features to generate a feature subspace. Step 430A may use a binary vector standing for the union of evidences over the time to denote the value of each pair-wise correlation in the invariant model, with 1 denoting broken evidences during the time and 0 denoting non-broken evidences during the time. The chi-square feature selection method may be used on the historical fingerprints together with the fault/action labels to learn the most informative broken evidence. The selected most informative broken evidences may be updated by doing the feature selection in batch mode.

Step 430 may transfer both the historical representative fingerprints and the query fingerprint into binary feature vectors. Then, both the historical representative fingerprint feature vectors and the query fingerprint feature vectors are mapped into a feature vector subspace based on the selected most informative broken evidences. Step 430 may feed into step 440 that retrieves a feature vector based similarity using a Jaccard similarity.

Step 440 or step 450 may be used to feed into step 460 that suggests the historical action, depending on if the single modal or the multimodal was produced in step 420.

Step 460 may be used to improve the both the single modal and the multimodal fault diagnosis method 400. Step 460 may be used in step 470 to archive new fingerprints and update representative fingerprints. Step 470 may search a fingerprint database for the query fingerprint. If the search finds a match in the fingerprint database, then the representative fingerprint for the category that the query fingerprint belongs to may be updated. If the search does not find the query fingerprint in the fingerprint database, then the query fingerprint may be recorded as a new category or the query fingerprint may be recorded into a given category. The recorded instance may be the original matrix for the multimodal case or a feature vector for the single modal case.

Step 460 may initiate an action (e.g., a control action) on a controlled system, machine, and/or device responsive to the fault event detected and the action annotations attached to the representative fingerprint for the fault event detected in the fingerprint database. Such action can include, but is not limited to, one or more of: powering down the controlled system, machine, and/or device or a portion thereof; powering down, e.g., a system, machine, and/or a device that is affected by the fault event detected in another device, stopping a centrifuge when an imbalance is detected, opening a valve to relieve excessive pressure (depending upon the fault event detected), locking an automatic fire door, and so forth. As is evident to one of ordinary skill in the art, the action taken is dependent upon the fault event detected and the controlled system, machine, and/or device to which the action is applied.

Referring to FIG. 5, a block diagram illustrating a multimodal fault diagnosis method 500, in accordance with an embodiment of the present invention. In block 510, construct, using an invariant model, a fault fingerprint based on a fault event. In block 520, generate a feature vector in a feature subspace for the fault fingerprint, wherein said feature vector includes at least one status of at least one system component during the fault event. In block 530, determine a corrective action correlated to the fault fingerprint, from among a plurality of candidate corrective actions associated with the one or more historical representative fingerprints, based on a Jaccard similarity using the feature vector in the feature subspace. In block 540, initiate the corrective action on a hardware device to mitigate expected harm to at least one item selected from the group consisting of the hardware device, another hardware device related to the hardware device, and a person related to the hardware device.

FIG. 6 shows a block diagram of an exemplary environment 600 to which the present invention can be applied, in accordance with an embodiment of the present invention. The environment 600 is representative of a computer network to which the present invention can be applied. The elements shown relative to FIG. 6 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 600 at least includes at least one safety system or device 602, at least one fault detection system 605, at least one computer processing system 610, at least one controlled system(s), machine(s), and/or device(s) (individually and collectively denoted by the reference numeral 620 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 610 can be any type of computer processing system including, but not limited to, servers, desktops, laptops, tablets, smart phones, media playback devices, and so forth, depending upon the particular implementation. For the sake of illustration, the computer processing system 610 is a server.

The at least one fault detection system 605 is configured to detect one or more fault events. The computer processing system 610 is configured to perform fault diagnosis via efficient temporal and dynamic historical fingerprint retrieval. Moreover, the computer processing system 610 is configured to initiate an action (e.g., a control action) on the controlled system, machine, and/or device 620 responsive to the detected fault event. Such action can include, but is not limited to, one or more of: powering down the controlled system, machine, and/or device 620 or a portion thereof; powering down, e.g., a system, machine, and/or a device that is affected by an anomaly in another device, stopping a centrifuge being operated by a user 620A before an imbalance in the centrifuge causes a critical failure and harm to the user 620A, opening a valve to relieve excessive pressure (depending upon the anomaly), locking an automatic fire door, and so forth. As is evident to one of ordinary skill in the art, the action taken is dependent upon the type of anomaly and the controlled system, machine, and/or device 620 to which the action is applied.

The safety system or device 602 can implement the aforementioned or other action. The safety system or device 602 can be a shut off switch, a fire suppression system, an overpressure valve, and so forth. As is readily appreciated by one of ordinary skill in the art, the particular safety system or device 602 used depends upon the particular implementation to which the present invention is applied. Hence, the safety system 602 can be located within or proximate to or remote from the controlled system, machine, and/or device 620, depending upon the particular implementation.

In the embodiment shown in FIG. 6, the elements thereof are interconnected by a network(s) 601. However, in other embodiments, other types of connections (e.g., wired, etc.) can also be used. Additionally, one or more elements in FIG. 6 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for multimodal fault diagnosis, the method comprising:
    constructing, by a processor using an invariant model, a fault fingerprint based on a fault event;
    generating, by the processor, a feature vector in a feature subspace for the fault fingerprint, wherein said feature vector includes at least one status of at least one system component during the fault event, with fault fingerprint feature vectors generated from the fault fingerprint and one or more historical representative fingerprint feature vectors from the one or more historical representative fingerprints;
    determining, by the processor, a corrective action correlated to the fault fingerprint, from among a plurality of candidate corrective actions associated with the one or more historical representative fingerprints, based on a Jaccard similarity using the feature vector in the feature subspace; and
    initiating, by the processor, the corrective action on a hardware device to mitigate expected harm to at least one item selected from the group consisting of the hardware device, another hardware device related to the hardware device, and a person related to the hardware device.

2. The computer-implemented method of claim 1, wherein the invariant model learns continuous pair-wise correlations between one or more system components during the fault event.

3. The computer-implemented method of claim 2, wherein the invariant model computes a normalized residual between a measurement for one of the pair-wise correlations and an estimate for the one of the pair-wise correlations, wherein the normalized residual exceeding a predetermined threshold signals the one of the pair-wise correlations is broken.

4. The computer-implemented method of claim 1, wherein the invariant model includes an autoregressive model.

5. The computer-implemented method of claim 1, further comprising generating the feature subspace using one or more binary vectors representing each of one or more pair-wise correlations in the invariant model.

6. The computer-implemented method of claim 5, wherein the one or more binary vectors has a value of 1 if the represented one or more pair-wise correlations is broken and 0 otherwise.

7. The computer-implemented method of claim 1, wherein the generating the feature vector further includes mapping the fault fingerprint feature vectors and the one or more historical representative fingerprint feature vectors in the feature subspace based on informative broken evidence.

8. A non-transitory article of manufacture tangibly embodying a computer readable program which when executed causes a computer to perform the steps of claim 1.

9. A computer-implemented method for multimodal fault diagnosis, the method comprising:
    constructing, by a processor using an invariant model, a fault fingerprint based on a fault event;
    generating, by the processor, a feature subspace using one or more binary vectors representing each of one or more pair-wise correlations in the invariant model with a chi-square feature selection method using one or more categories of historical fingerprints with one or more fault labels;

generating, by the processor, a feature vector in the feature subspace for the fault fingerprint, wherein said feature vector includes at least one status of at least one system component during the fault event;

determining, by the processor, a corrective action correlated to the fault fingerprint, from among a plurality of candidate corrective actions associated with the one or more historical representative fingerprints, based on a Jaccard similarity using the feature vector in the feature subspace; and initiating, by the processor, the corrective action on a hardware device to mitigate expected harm to at least one item selected from the group consisting of the hardware device, another hardware device related to the hardware device, and a person related to the hardware device.

10. The computer-implemented method of claim 9, wherein the invariant model learns continuous pair-wise correlations between one or more system components during the fault event.

11. The computer-implemented method of claim 10, wherein the invariant model computes a normalized residual between a measurement for one of the pair-wise correlations and an estimate for the one of the pair-wise correlations, wherein the normalized residual exceeding a predetermined threshold signals the one of the pair-wise correlations is broken.

12. The computer-implemented method of claim 9, wherein the invariant model includes an autoregressive model.

13. The computer-implemented method of claim 9, wherein the one or more binary vectors has a value of 1 if the represented one or more pair-wise correlations is broken and 0 otherwise.

14. The computer-implemented method of claim 9, wherein the generating the feature vector includes generating fault fingerprint feature vectors from the fault fingerprint and one or more historical representative fingerprint feature vectors from the one or more historical representative fingerprints.

15. The computer-implemented method of claim 14, wherein the generating the feature vector further includes mapping the fault fingerprint feature vectors and the one or more historical representative fingerprint feature vectors in the feature subspace based on informative broken evidence.

16. A non-transitory article of manufacture tangibly embodying a computer readable program which when executed causes a computer to perform the steps of claim 9.

* * * * *